(12) United States Patent
Im

(10) Patent No.: US 8,333,346 B2
(45) Date of Patent: Dec. 18, 2012

(54) SKY STATION

(76) Inventor: Sunstar Im, Lancaster, CA (US)

( * ) Notice: Subject to any disclaimer, the term of this patent is extended or adjusted under 35 U.S.C. 154(b) by 285 days.

(21) Appl. No.: 12/592,031

(22) Filed: Nov. 18, 2009

(65) Prior Publication Data

US 2011/0114792 A1    May 19, 2011

(51) Int. Cl.
*B64G 1/00* (2006.01)
(52) U.S. Cl. .............. 244/158.1; 244/125; 244/171.6; 244/172.4
(58) Field of Classification Search .......... 244/158.1, 244/159.4, 173.1, 172.4, 171.6, 125
See application file for complete search history.

(56) References Cited

U.S. PATENT DOCUMENTS

| | | | | |
|---|---|---|---|---|
| 3,144,219 A * | 8/1964 | Schnitzer | | 244/158.3 |
| 3,169,725 A * | 2/1965 | Berglund | | 244/158.3 |
| 3,232,561 A * | 2/1966 | Adams | | 244/166 |
| 3,348,352 A * | 10/1967 | Cummings | | 52/646 |
| 3,744,739 A * | 7/1973 | Weaver et al. | | 244/172.4 |
| 4,730,797 A * | 3/1988 | Minovitch | | 244/158.3 |
| 6,045,094 A * | 4/2000 | Rivera | | 244/159.4 |
| 6,206,328 B1 * | 3/2001 | Taylor | | 244/159.6 |
| 2006/0163434 A1 * | 7/2006 | Patel et al. | | 244/158.3 |

* cited by examiner

*Primary Examiner* — Philip J Bonzell

(57) ABSTRACT

A single center elevator, circle inner-ring, circle outer-ring elevator, vertical fuselage flight, vertical plan multi-floor section, bottom escape cockpit, top escape cockpit, mass-levitate, ascend, descend flight, first, second, third, fourth section, control tower, bed, food service, lavatory, landing pad, winch machine, jet/rocket fuel tank, circle passage hole, rope anchor hook, earth terminal station, center-hanger, up nozzle, down nozzle, Jet/rocket power plants, inner-docking bays, outer docking bays, multi robotic arms, cone shaped circular, glue, cylindrical multi-soft envelopes, cylindrical thick outer wall envelope, ceramic fiber fabric, geometric form, web-mesh carbon wire, upper chute-flap, down chute flap, helium gas, float, circle center post pole, truss bridge, top circle truss, hover, anchors, parking zone, V-shaped circle, laser, floor gate, test-gauge, repair/inspection, guy-wires, heavy grade mesh-ceramic fiber, launch/docking platforms, light grade web-mesh ceramic fiber, cargo-transporter, airship, disc-shaped circle structure.

8 Claims, 17 Drawing Sheets

90.-- rockets  91.-- 75,000 foots to 150,000 foots range.  92.-- space station.
93.-- air ship.  94.-- space ship.  95.-- satellites.  96.-- enemy ICBM.
97.-- moon.  98.-- earth station.  99.-- laser beams.  100.-- sky station.

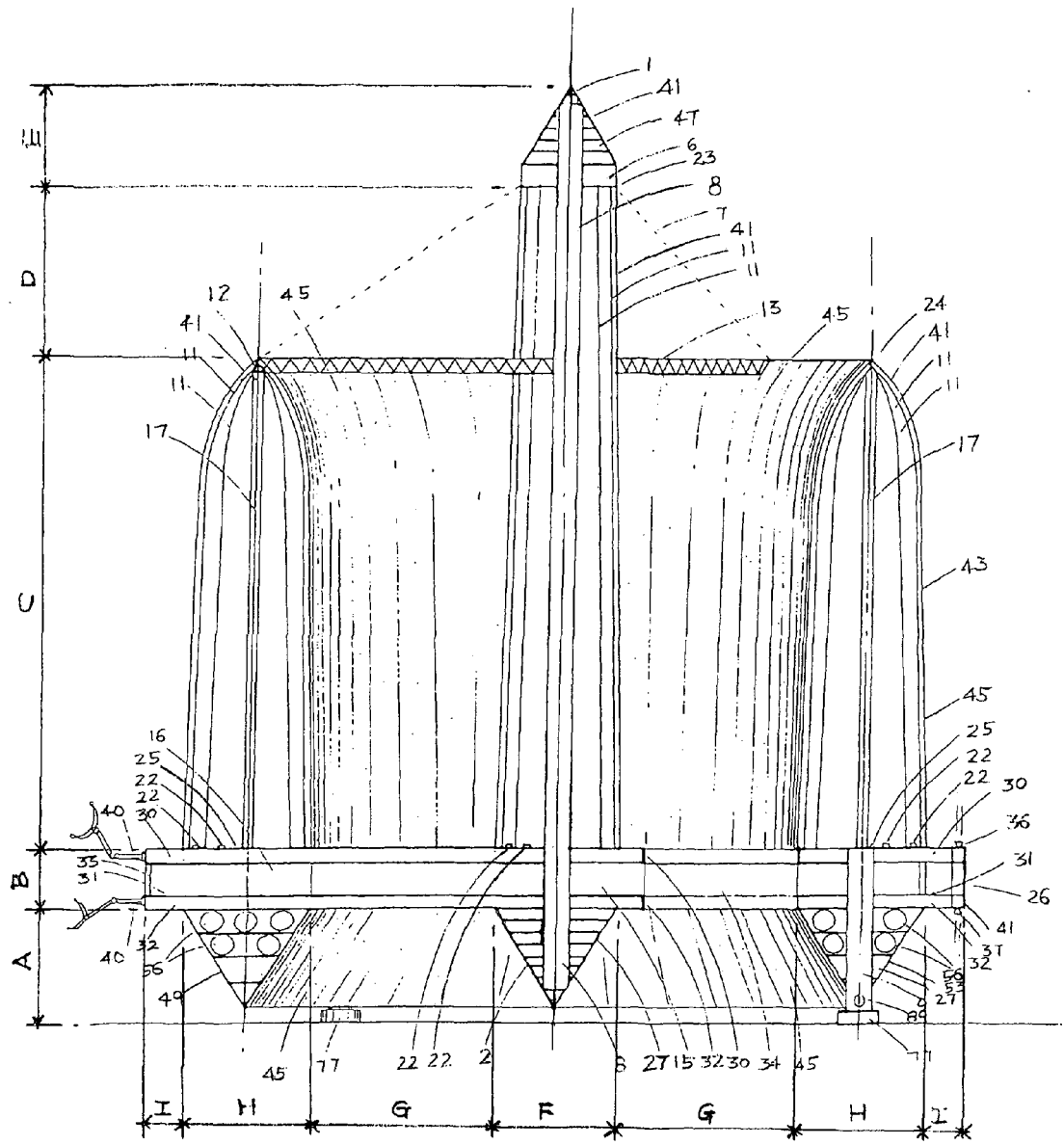

Description of Drawing; As shown Fig 17. (New drawing)

A, First section level.  B, Second section level.  C, Third section level.
D, center ring of fourth section level.  E, top fourth section level.
F, center core of inner ring structure.
G, Inner docking open space structure (four position circle ring docking port)
H, Large-outer ring structure.
I, Circular outer ring edge structure ( Jet and rocket propulsion compartments,
   And outer ring docking bay.)

SKY STATION

BACKGROUND OF THE INVENTION

U.S. Pat. No. 6,491,258 in prior art.

FIELD OF THE INVENTION

How can we operate to mass-levitate and launch the rocket ships into space at low cost with in advanced technology? This concept makes has me start to research my work, and to present a "sky station vehicle". The sky-transportation vehicle is lighter than air vehicle, more particularly related to helium filled vehicles which are pressurized with helium gas using bag envelopes attached inside the vehicle.

The sky station vehicle of the present invention is similar to known sky-transportation vehicles as helium is used to levitate the sky station. Specifically, the sky station further comprises combined jet and rocket propulsion thrust power to control the speed of flight and operate, vertically ascend and descend from earth's surface to high altitude atmosphere in the stratosphere. Sky station comprised mass-load capacity fuselage structure provides a mass-transportable sky-vehicle for passengers and loads flights, from an earth terminal station to a sky station parking zone, which will operate jet propulsion thrust power to lift off from an earth terminal station and vertically ascend in flight around seventy five thousand feet in the sky. Rocket propulsion power will take over the jet propulsion stage and continue to vertically ascend in flight to the sky station parking zone in the stratosphere. Also, when returning to earth, the terminal station's rocket propulsion power to vertically descend flight to earth station terminal at around seventy five thousand feet.

A transition stage of mid density atmosphere will take over by jet propulsion power to continue vertically descending in flight, Slowly operate and adopt to a docking approach at below the docking port hook and locking at earth terminal station by the winching machine with a multi-rolling rope hook anchor system of autonomous operating system. Finally, docking the Space-station at an earth terminal station and then unloading cargo with multi-robotic arms which are controlled by computer system.

The sky station is not only a sky-transporter vehicle, it is also a rocket launcher vehicle and allows rocket ships to transport from earth station to sky station at parking zone stratosphere then prepared to launch the rocket ship into orbit which is a launch method that is cheaper. Less stress and advanced propulsion technology at earth based rocket launch system is expensive mass-fuel, and high operating cost. I had been trying to find similar functions of sky station vehicles in a prior art but never found them. Levitate the sky station on high altitude rather than a space orbit, because a high altitude atmosphere stratosphere is a close distance relate to the earth's surface, therefore we can see the sky station's daily operation activity.

Also, we could build vertical fuselage shaped structures of mega sky station right on earth and lift off vertically levitate and ascend flight toward high altitude atmosphere stratosphere, they are easier to build mass-structures and operating costs are cheaper in economic terms, Build a vertical and cylindrical fuselage structure, pressure filled mega-helium bag envelope is gradually expanded at low density high altitude atmosphere stratosphere because, of the gradually decrease in density of atmosphere pressure. Also, floating and hovering at mid-level parking zone. Therefore, the Sky station needs to operate to push upward vertical flight to reach the parking zone by rocket propulsion thrust power to reach to Sky station parking zone. Also, the Sky station parking zone is at each operating parking zone level of the atmosphere. Therefore, in case of time travel down to earth station, it should use rocket propulsion thrust power to bring down flight sky station.

Therefore, use rocket thrust-power force to vertically descend flight toward earth terminal station. Otherwise, it will never move down flight, because mass atmosphere pressure on a helium bag of envelop is effect to resist to float at micro-atmosphere parking zone stratosphere. Therefore, use helium gas bag envelope's principle advantage to levitate character. It is called natural-phenomena "Levitation" and floating in atmosphere stratosphere. There is a reason for, the Sky station using helium bag envelope. Sky station vehicles have to operate vertically to ascend in flight and descend in flight from earth station to sky station in stratosphere, it is not like horizontally flown airships flight function. Therefore, the Sky station's basic design structure is built in a circle shaped cylindrical plan and vertical up-right fuselage position of an aerodynamic structure from top to bottom, which, operates vertically to ascend flight and downward descend flight by combined jet and rocket propulsion thrust power to push upward or push downward, flight of the Sky station by force of thrust power to control the moving speed velocity of Sky station. Not as like built horizontally flying the airship function of operation method.

Specifically, multi-cylindrical and vertical fuselage shape of circle envelopes built on right on top of the circle shaped rigid fuselage structure. Therefore, top position of helium bag of envelopes pulled to upward levitate the whole fuselage structure of dead weight and plus load at atmosphere pressure. Therefore, sky station is comprise large helium gas bag of envelopes anchor to build at top of fuselage structure. Sky station fuselage structure comprise large circle disc shaped vertical plan structure from the 15 first, second and third floor level of second section level structure with large outer-circular wall which is arranged installed combined jet and rocket power plant compartment with insulated wall and door at multi-position circular direction at second floor edge of second section level structure and specifically, to arrange an inner-circle launch/docking platform bay is between an inner-ring and outer-ring structure at from first through third floor of second section level which of vertical passage circle hole diameter is around two hundred fifty feet in open space in four positions to provide docking and undocking with vertical flight fuselage position provides load and unload by multi-robotic arm's autonomous operation system. Inner circle direction of four position launch-docking circle open space is located between center-ring hanger and outer-ring structure which is disposed to anchor the multi-robotic arms at circle edge floor of first and third floor of second section level structure which will be easy to operate and quickly adopt to grab and safe-guide the in docking sky-transporter vehicle.

Also, outer-launch docking bay is comprised of four position circle direction at north, south, east and west point which door is arrange to disposed the large curved slide gate at second floor edge of second section level structure is about one hundred feet width and sixty feet height curved panel door structure which is operated by computer electro autonomous system. Also, a combined multi-jet and rocket propulsion power plant is comprised at the edge floor of the second floor or second section level, arranged to circle direction through same distance a part co-exist jet and rocket propulsion power plant with fully operate to connect fuel line gauge panel, pumping-line system provide maximum thrust power for sky station. Also, a multi-jet and rocket nozzle comprised at the bottom of first circle floor and the top of third floor is arranged in a circular a part distance at multi-position provides guided direction thrust power by bottom chute nozzles at bottom of first floor of second section level structure is provide vertically upward ascend and top chute nozzles at top of third floor of second section level structure is provide vertically downward flight of the sky station's navigation. Specifically, multi-elevator system of major single cylindrical center elevator shaft comprised from bottom escape-cockpit of first section level to top escape cockpit of fourth section level of multi-level floor is connected and integrated each level floor and wall structure is as solid single structure, which is single circle-cylindrical center elevator provides reliable transportation from the bottom through to the top office, not only crew, but also, machine and large equipment.

Further, outer-multi-elevators comprise at outer ring structure at circular multi-distance around four positions from bottom floor landing pad of first section level to third floor of third second section level structure is provide reliable transportation of crew, machine, passengers and variety equipment. A cone-shaped circle inner multi-floor of first section level structure is comprised at the top of first section level structure is direct connected and integrated to the bottom of second section level structure of circle shaped center ring structure which is bottom escape-cockpit at bottom cone structure with window around wall and multi-ejector rocket propulsion systems arrange to mount at round upper side circle wall structure for a propulsion thrust power system with a large parachute which is provided to escape from the Sky station and save lives in an emergency. Further, a cylindrical elevator shaft with a sliding door to operate by electro-computer system, a multi-level of control and operating office, passenger room, multi-Bedding and lavatory, food service room, fuel, and a water and helium gas pumping station room.

Further, the top of circle V-shaped large outer-ring structure of first section level is directly connected and integrated to the bottom of second section level structure which is a multi-position of outer ring elevator, it is inter-connected and provides transportation for the crew and all necessary machines from the bottom landing pad of first section level through second level's office in daily operation. Further, a large-outer ring V-shaped circular structure of the first section level provides jet and rocket fuel storage room, maintenance room, machine shop, plumbing, pneumatic, electric, hydraulic, communication room, navigation control equipment and a solar/battery converting service room.

The first floor of the third section level is comprised to arrange an inner ring and outer ring helium gas envelope structure for a vertically upward levitation function of the Sky station. A multi-circle cylindrical helium gas bag of envelope comprise on top of first floor of the third section level comprise an arrangement to anchor the bottom position of a large-circle envelope attached on a circular anchor plate through a circle direction of inner multi-ring positions by patching and gluing together to make a dried circle all around in and out circle line is leak proof by glued and leakage tests have to be done. The next step start it lift and hanging on top ceiling circular anchor plate of fourth section level structure by wire hooking and lifting by winching machine to high lift and to anchor each portion of the circular envelope connected through a circular direction which is needed to endurance time, efficient machine operation and material support by multiple groups. Fully coordinated work is needed, which includes to start building from first inner circle envelope to outward multi-envelope to set and anchor constructed method is a better performance. Specifically, a mega-scale size of multi-circle helium gas-bag envelopes is providing a "mass-levitating" effect on the Sky station.

Further, each cylindrical mega-envelope is built by rolling a tube bag technique, which is an endless flexible large wide fabric ribbon strip attached on one end of air pressurized fabric tube-mandrel and a continued rolling sequence to automatically continue advance forward proceed ribbon winding system while follow continue spray medium hot air-glue application which is needed and constantly checking the thickness of the web envelope and weight of fabric and uniform quality product. It may be already factory made in product by special order item, but better performance which has the variety to choose to develop a technique is essential for the Sky station.

Large circular outer ring's helium gas envelope at bottom edge of circle line fabric is the anchor at circular anchor plate at first floor edge of third section level structure to anchor the circle anchor plate of bottom ceiling circle edge floor of fourth section level structure which is through a circular direction of fuselage floor and glued, dried by a vacuum pump and checked by leak proof gauge testers. An individual inner-circle multi-soft envelopes of outer ring structure is comprised at the edge line of top portion of the envelope is lifted, hanging and anchor on circle anchor plate of top of multi-center-post pole, which is arrange to set to circular direction of same distance a part to anchor at on top of circle anchor plate of center post pole and bottom edge of the individual multi-circle soft-envelopes anchored at each circular direction of the inner ring and outer ring structure of first floor envelope zone at third section level structure and top edge of individual multi-circle soft-envelope is anchored at top of the circular anchor plate of center post pole. Further, each envelope's floor gate comprise each envelope area zone has to be supplied the helium gas with pipe line through floor gate with pressure gauge system and the need to inspect, and repair service for sky station operations. Further, multi-circle soft envelopes at the inner and outer ring structure comprises multi-geometric forms of heavy weight grade ceramic web-mesh fabric between multi-layer of ceramic fiber fabric is integrated and impregnated by glue and pressurized roller technique, which is a flexible uniform processing which is thinner in thickness than one sixteen inch thickness. Outer large thickness envelope is one eight inch thickness structure of inner and outer ring structure of third section level comprise almost same processing technique as individual soft envelope more to medium thickness at some part of envelope.

Furthermore, a cylindrical tall and large circle single center elevator and multiple outer ring elevator shafts are pre-built structure and assembled later with the whole structure, which is comprised of thick and multi-geometric forms of heavy grade ceramic web-mesh fabric into between multi-sheet of ceramic fiber fabric is laid down with a rolled technique on pressurized air bag of cylindrical mandrel by automatic rolling and control machine and continue feeding strip of ceramic fabric on mandrel from the beginning roll to end roll processing is need to precise thickness is about one inch to two inch uniform circle form of necessary quality.

Furthermore, each outer circle wall and each floor of bottom center cone and V-shaped structure of first section, mid-level of second section and top of fourth section level structure is a fabricated circle pre-cast structure is built with a large thickness and is around one inch to two inches thick similar to the center elevator thickness, but it may combined thicker at some part of the structure is desirable.

Further, multi-truss bridge comprise from two third high level positions of circle center elevator wall structure connect at circular multi-position of top outer-ring circle truss structure is to secure strength at top of the large circle envelope structure at third section level structure. Furthermore, bottom floor of fourth section level is directly connected and integrated on top of the center inner-ring structure at third section level structure and single center elevator shaft is directly connected, which provides transportation to the top level of the fourth section level to the bottom multi-floor level through to first section level structure.

The top floor of the fourth section level and top floor of center cone shaped structure comprise top escape-cockpit as dual system provides safety net is priority at Sky station in daily operation, which of top escape-cockpit comprise multi-eject rockets with multi-nozzles around cone shaped bottom portion of inner structure through outer wall which is blast off outer to downward. Therefore, escape-cockpit is blast off to up-ward flight in emergency which is equipped with multi-large parachute and safe land and save life as crew and passengers, cone shaped bottom escape cockpit's ejector rocket blast outer-upward position, therefore bottom escape cockpit is blast off below downward flight and autonomous operate parachute is safe to land and save lives of top and bottom dual escape system is unique at Sky station operation. Furthermore, skin of outside wall of envelopes at inner and outer-ring structure comprise multi-photo solar cell films at inner and outer ring structure for the collection of solar energy to covert to multi-battery pack system and provides electric power in Sky station.

SUMMARY OF THE INVENTION

The present invention is to a sky station activity of the future. I have been trying to find the concept of how to operate helium filled balloons attached on to the top of the fuselage structure, operated to vertically levitate the sky-transport vehicle from an earth terminal station to a high altitude stratosphere and force to further a vertically upward ascending flight into low orbit space and descend flight by combined jet and rocket propulsion thrust power. The present sky station is as a rocket launcher vehicle, to launch the rocket ships into space at docking/launch platform of sky station at high altitude stratosphere. Also, sky-transportation vehicle in the future, but I could not found in prior arts in U.S. patents. Therefore, I discovered that the behavior of the helium gas bag envelope reacts at atmosphere through micro-space, mass-levitate and float vehicle itself with mass-load and passenger operate to vertically ascend and descend in flight by combined jet and rocket propulsion thrust power. The present invention is pressurized lighter than air gas medium as helium, which is injected into the cylindrical envelope structure which is located from first floor of third section level to top ceiling of third section level structure. Therefore, Sky station itself can vertically levitate the whole structure and mass-load of Sky station and operate levitate to flight at atmosphere, like a balloon craft as an airship craft, which is used for sky-transportation vehicle as present Sky station.

Another objective of the invention is provide a sky station's with control of flight direction by combined jet and rocket propulsion thrust power to speed up vertically ascend flight to parking zone at stratosphere and also vertically descend flight to earth terminal station with mass-load, including crew and passengers. The present invention has solved vertical flight navigation of aerodynamically efficient fuselage configuration cone shaped at top and bottom structure of Sky station, which is comprised top and bottom of dual-escape cockpit and has a combined jet/rocket dual propulsion thrust power.

The present invention has a central fuselage and outer ring structure each of which with elevators. There are inner and outer dual-launch/docking bays and a plurality of outer robotic arms that handle the incoming space transporter and other loads. Also, possible vertical flight through beyond high altitude atmosphere stratosphere to low-orbit space in vision.

Another objective of the invention is to provide sky station with aerodynamically efficient flight with circle and cylindrical shape of fuselage structure which is cone shaped at top of the fourth level section level structure and double circle ring of cylindrical tube envelope structure at third section level of mid-fuselage, which is single, tall, cylindrical center elevator shaft at center of inner structure and outer multi-elevator in-cooperated from top to bottom integrated, which surrounded by cone-shaped cylinder inside multi-soft envelope and hard and thick envelope is covered outside wall structure.

Further, a plurality cylindrical helium gas bag envelope of outer-ring structure of third section level comprise inside individual cylindrical soft envelope and hard, thick envelope is covers the outside wall envelope structure. Therefore, multi-mega helium gas envelope levitates the whole dead structure and mass-load of Sky station.

Further, bottom floor of third section is directly connected on top floor of circle disc-shaped third level of second section level and large circle disc shaped and three level structure of second section level structure provide combined jet and rocket propulsion. Power plant are located around circular edge at four portion compartment with separated insulated wall and door at mid floor of second section level structure. Further, head of intake of jet power plant arrange to locate sit on edge circle floor and face toward outside atmosphere through circle hole-duct at wall, which is guided to sucking air into intake of jet power plant which is where fuel is mixed, thus providing jet propulsion thrust power. The discharge of hot pressure exhaust air through a two-way control valve system is through a bottom chute-flap at bottom floor and others top chute-flap at top of third floor of second section level, which jet propulsion thrust power is to provide two way duct tube to upper and bottom chute-flap by two-way autonomous dual valve system is unique reliable and efficient technology, which is arrange to at top edge of third floor and bottom edge of first floor of second level structure, which both chute-flaps disposed moveable-guide thrust power flight direction of jet-propulsion thrust power. Also, rocket propulsion power plant is co-exist side by side with insulated wall with a jet propulsion compartment, which provides rocket thrust power to two-way duct tube upper-nozzle at top of circle edge of third floor and bottom nozzle at bottom of first circle edge floor of second section level structure. Each moveable nozzle provides direction of thrust.

Further, top floor of cone-shaped center inner-ring structure and top floor of V-shaped large circle outer ring structure of first section level structure is a direct connected to bottom floor of large-circle disc-shaped second section level structure, and center-ring portion of cone-shaped structure comprises bottom escape-cockpit. Bottom of cone-shaped first section level comprise eject-rocket propulsion engine around circle inner-wall with multiple nozzles which are disposed at multiple positions and help guide the structure to blast off in an outward direction at almost the same time. The escape cockpits may contain safety parachutes to slow decent.

There is a tall and large diameter single cylindrical center elevator shaft that is directly connected and integrated to each floor at multi-level structures and provide reliable transportation from bottom floor of first section level to top floor of fourth section level structure.

Another objective of the invention is to provide the sky station structure with an inner-ring circle with cylindrical fuselage comprising multi-cylindrical individual envelope provide to protect large volume helium-gas bags which are thicker and tuff on outside wall envelope and comprise multi-ceramic fiber fabric to construct, and the inside of the envelope is soft and flexible and strong in shear loads and made up of a ceramic fiber fabric envelope which is anchored to circle anchor plate at first floor of third section level to top circle anchor plate of bottom floor of fourth section level at inner ring structure and cone shaped each cylindrical soft individual bag and thicker, turf outside wall envelope of outer ring structure are anchored to a circle anchor plate at first floor of third section level to top circle anchor plate of center post, then leak proof sealed at all directions circle edge floor and test by pressure gauge.

Each envelope area zone comprises floor gate which supply the helium gas through pipe and gauge. Also, repair and inspect through gate which is seal ring disposed at around circle ring of the gate.

Another objective of the invention is to provide sky station a combined jet and rocket propulsion thrust power to push the sky station to operate in low to high speed flight and to vertically ascend flight to sky station parking zone in the stratosphere and downward flight to an earth terminal station. This is accomplished by using jet propulsion to help ascend the sky station up to around seventy five thousand feet at which point rocket power propulsion would take over to ascend the sky station into the stratosphere. The system would work in reverse for descent with the helium filled envelopes providing buoyancy.

BRIEF DESCRIPTION OF DRAWING

These other features, aspects and advantages of the present Inventions will become A better understood with reference to the accompanying drawings wherein;

FIG. 17. is a cross section of first, second, third, fourth section level structure of cross-section view of sky station of FIG. 7.

DETAILED DESCRIPTION EMBODIMENT OF THE INVENTION

Figure 1:
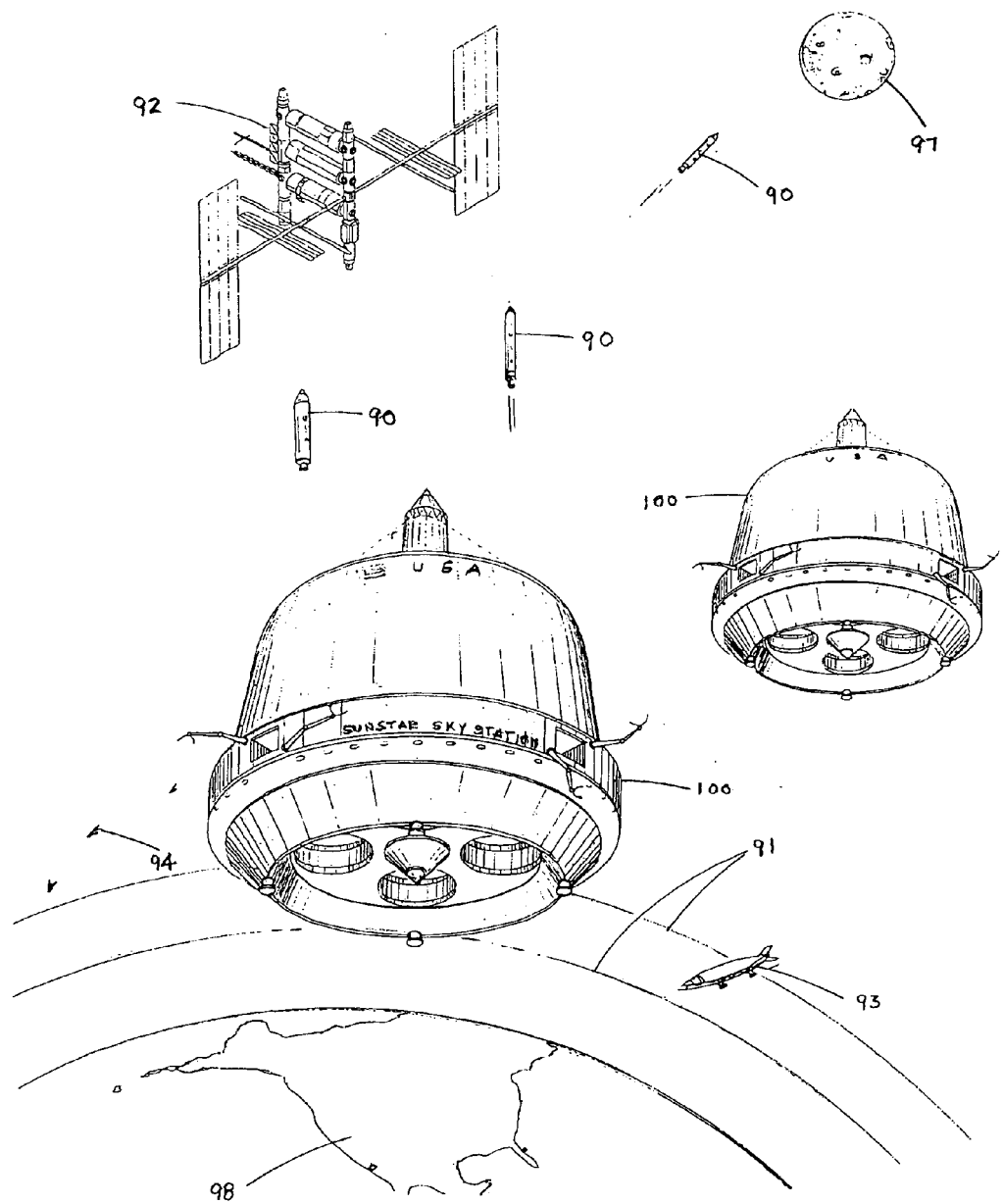
FIG. 1. is an Illustrated prospect view of sky station at sky.
Figure 2:
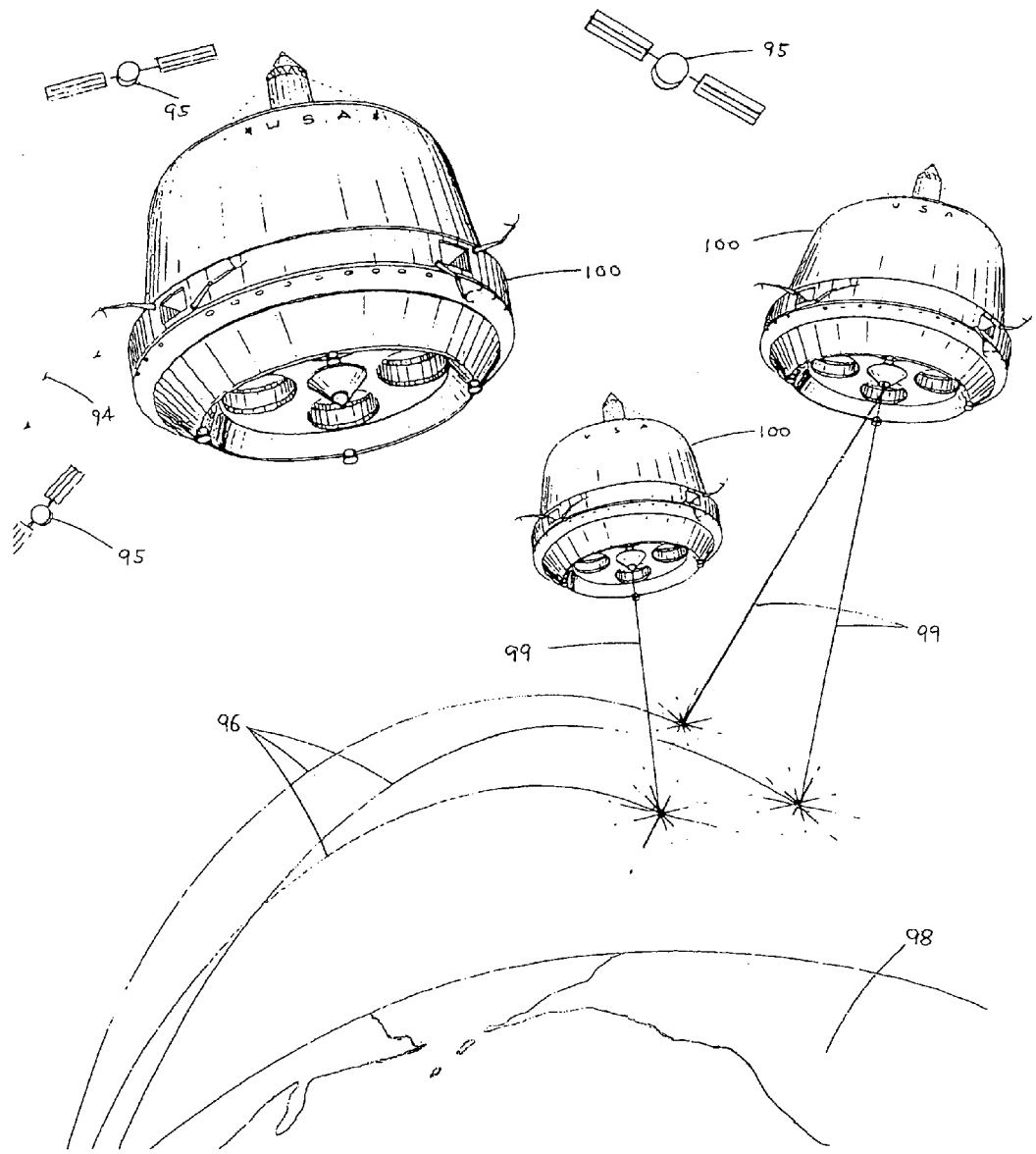
FIG. 2. is an Illustrated prospect view of sky station at sky.
Figure 3:
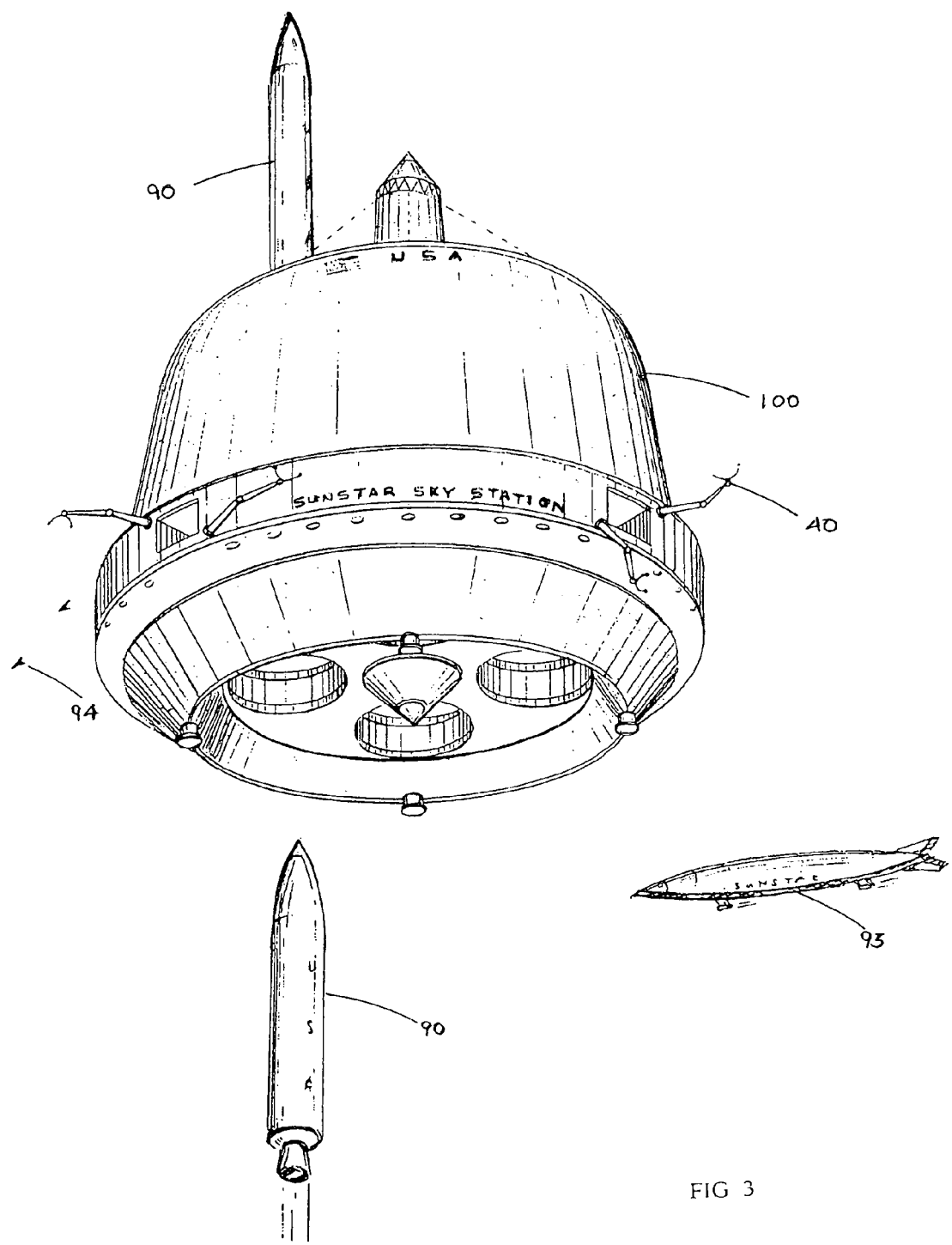
FIG. 3. is an Illustrated prospect closed view of sky station in the sky.
Figure 4:
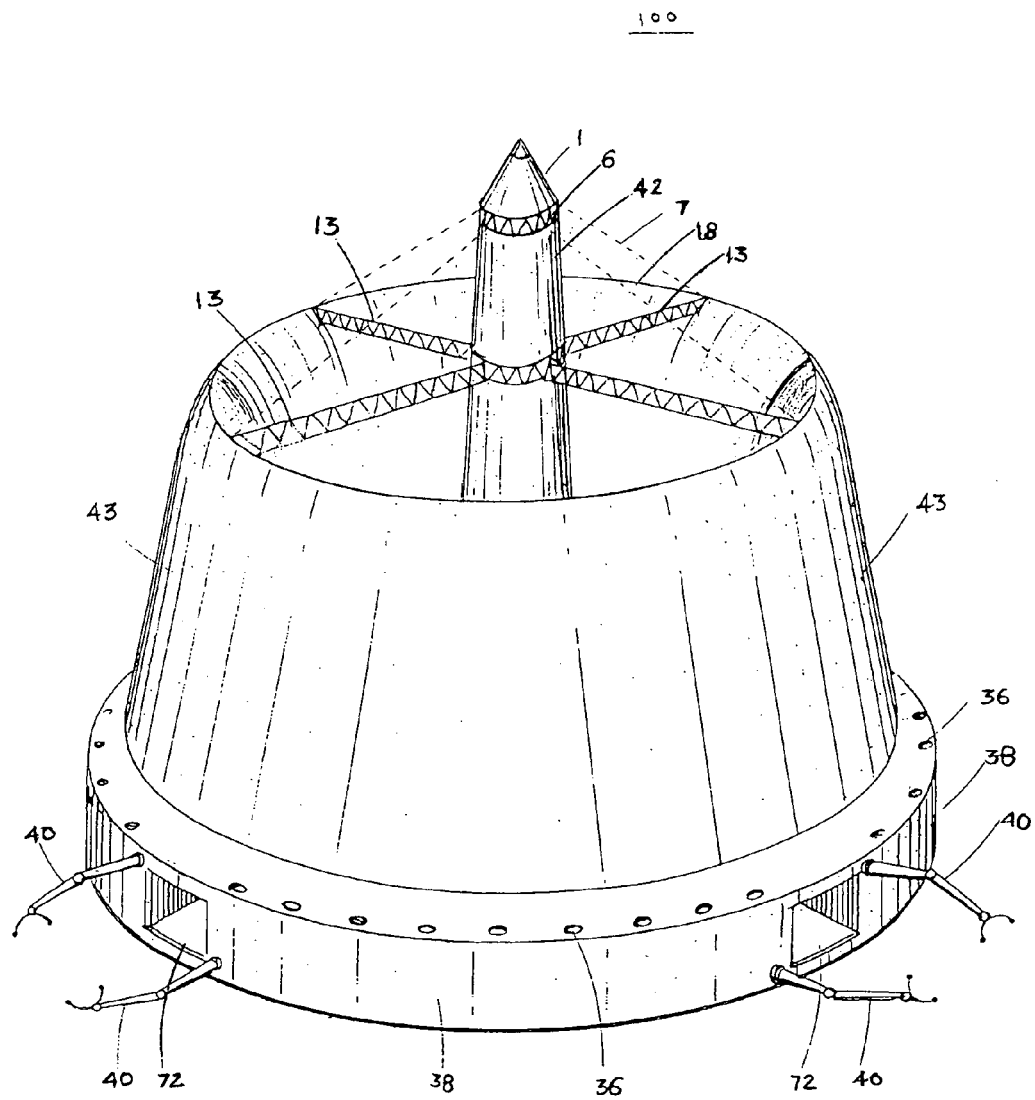
FIG. 4. is a prospect view showing the sky station having a structure according to an embodiment of the present Invention.
Figure 5:
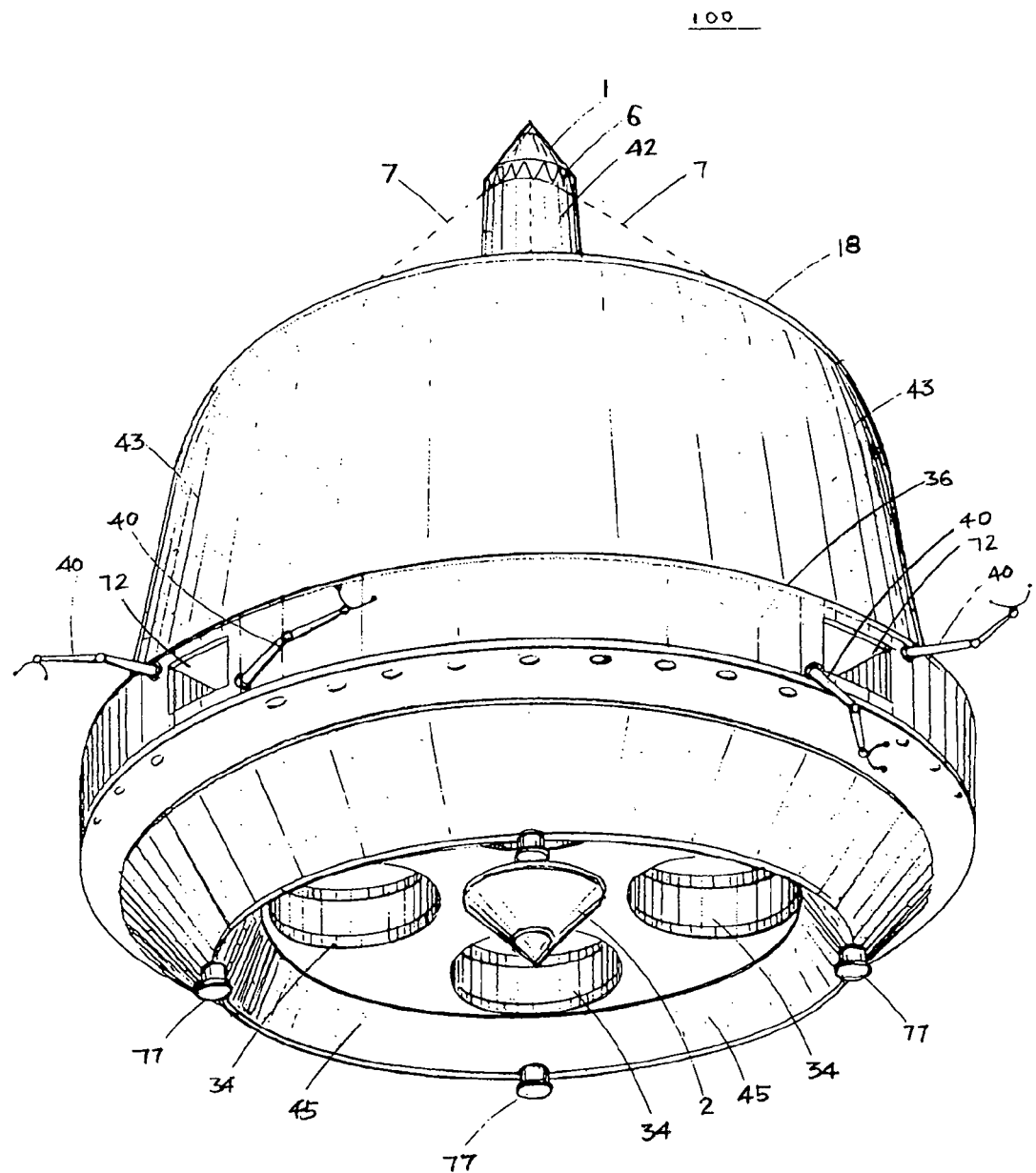
FIG. 5. is a prospect bottom view of sky station FIG. 4.
Figure 6:
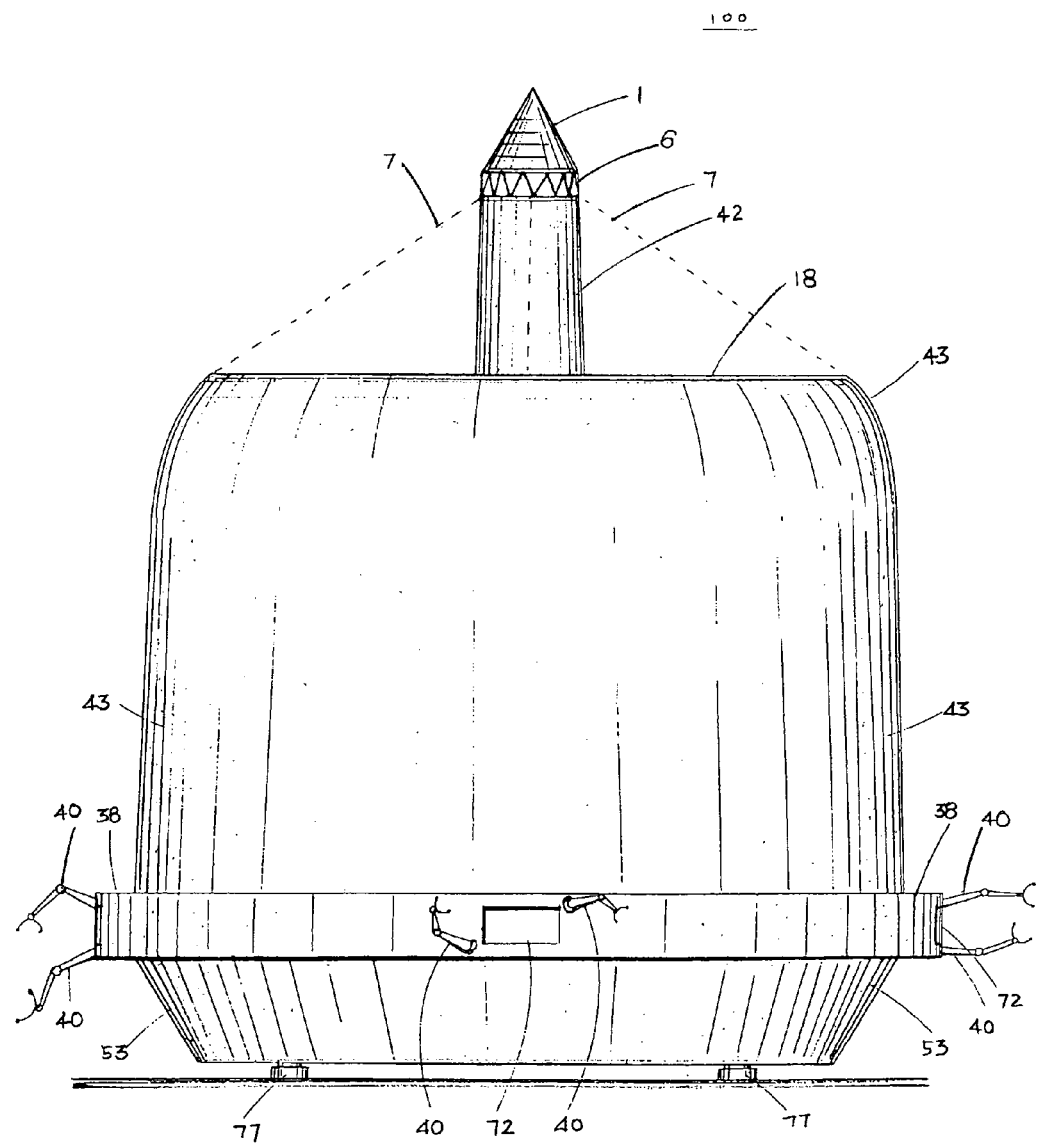
FIG. 6. is a front plan view, side plan view, rear plan view of sky station FIG. 4.

The Sky station structure for the Sky station 100, multi-level of circle shape fuselage structure comprising first 27, second 26, third 25, and fourth section level 24, of structure is vertically directly connected and integrated from bottom of first section level 27 structure to the top of fourth section level 24. The size of the single aerodynamic structure is around one thousand three hundred fifty feet diameter and one thousand five hundred fifty feet tall from the bottom to the top of the structure, as shown in FIGS. 7, 8, 9, 10, 11, 12, 13, 14, 15 and 17.

Figure 7:
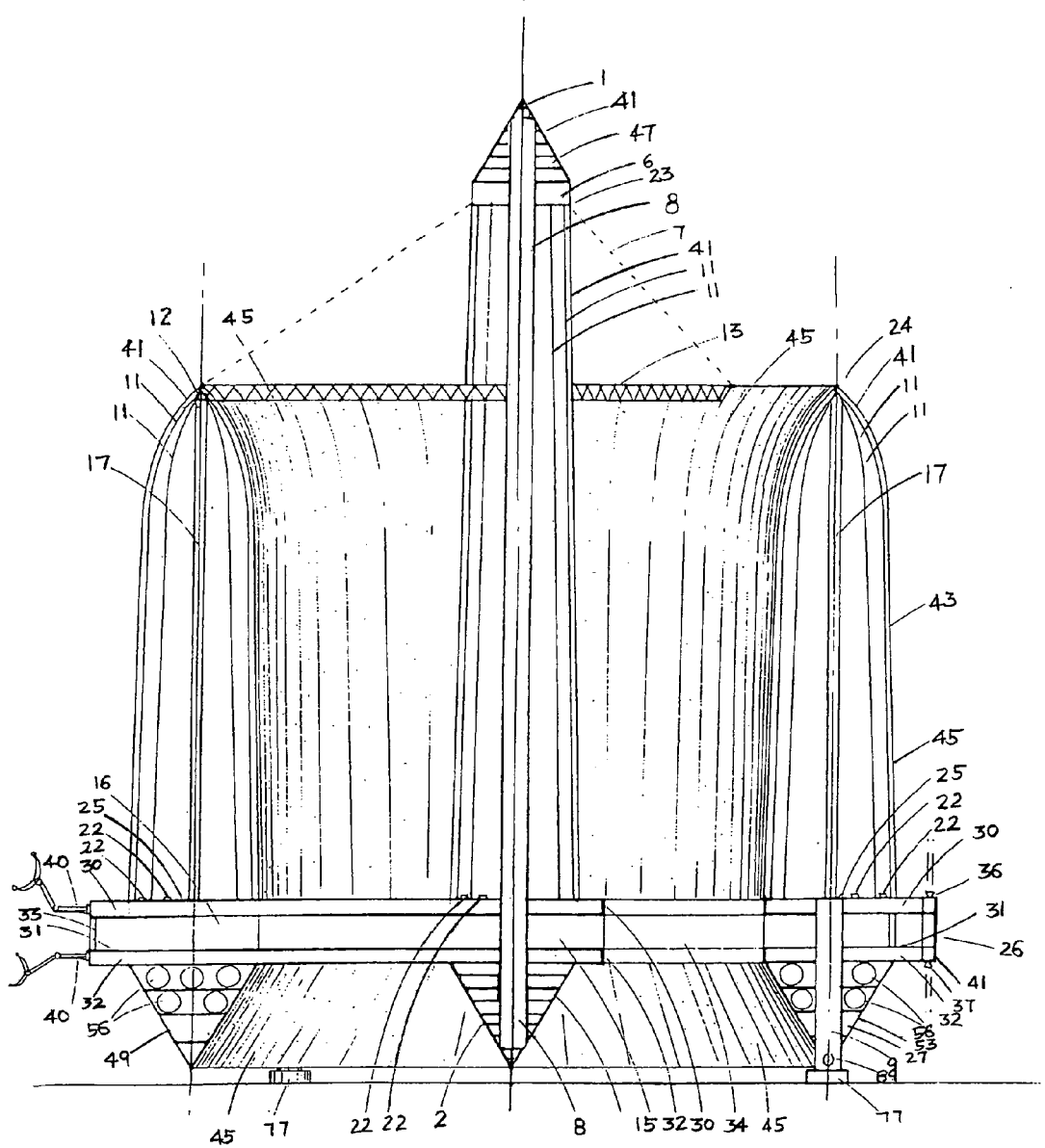
FIG. 7. is a cross-section A-A' view of sky station.
Figure 8:
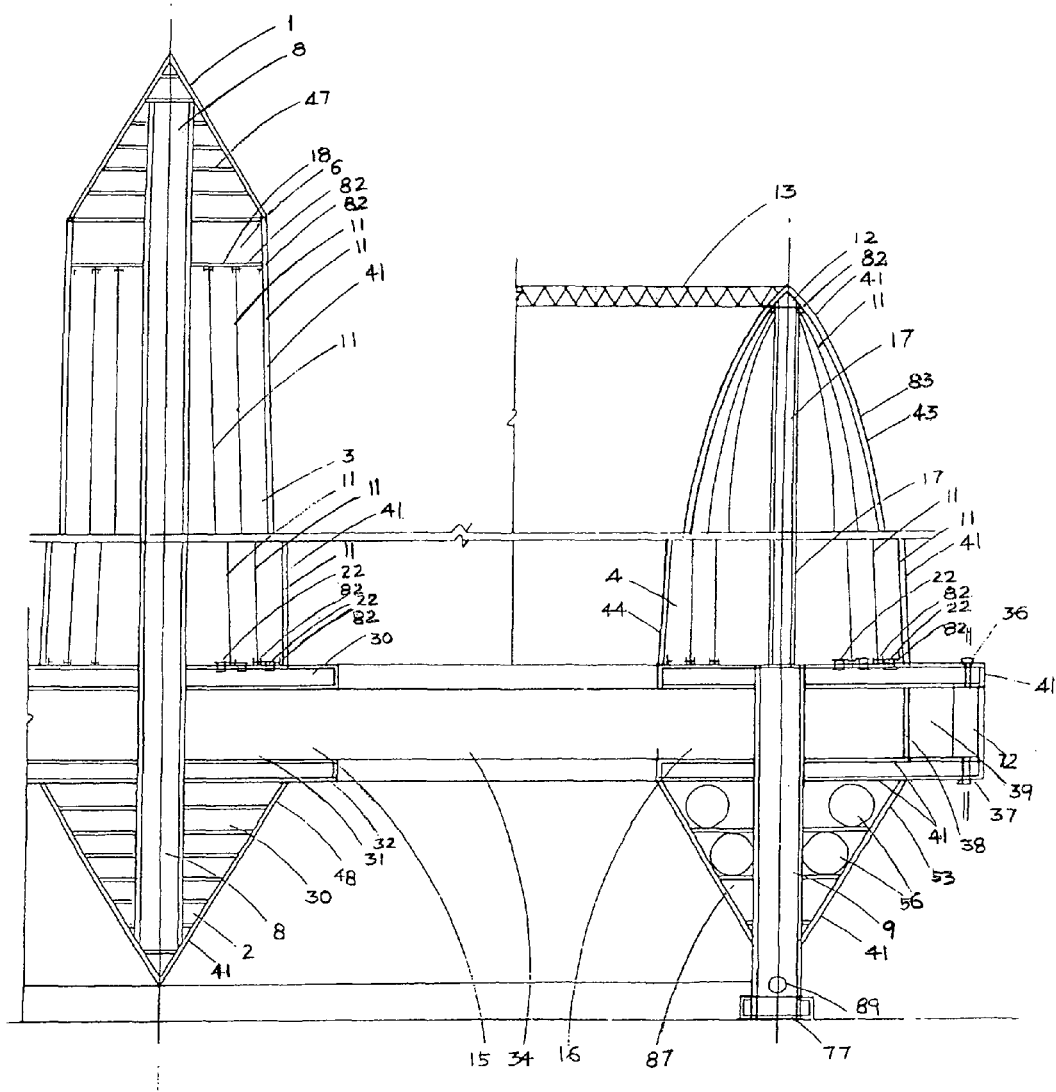
FIG. 8. is a large scale cross section detail view of sky station.
Figure 9:
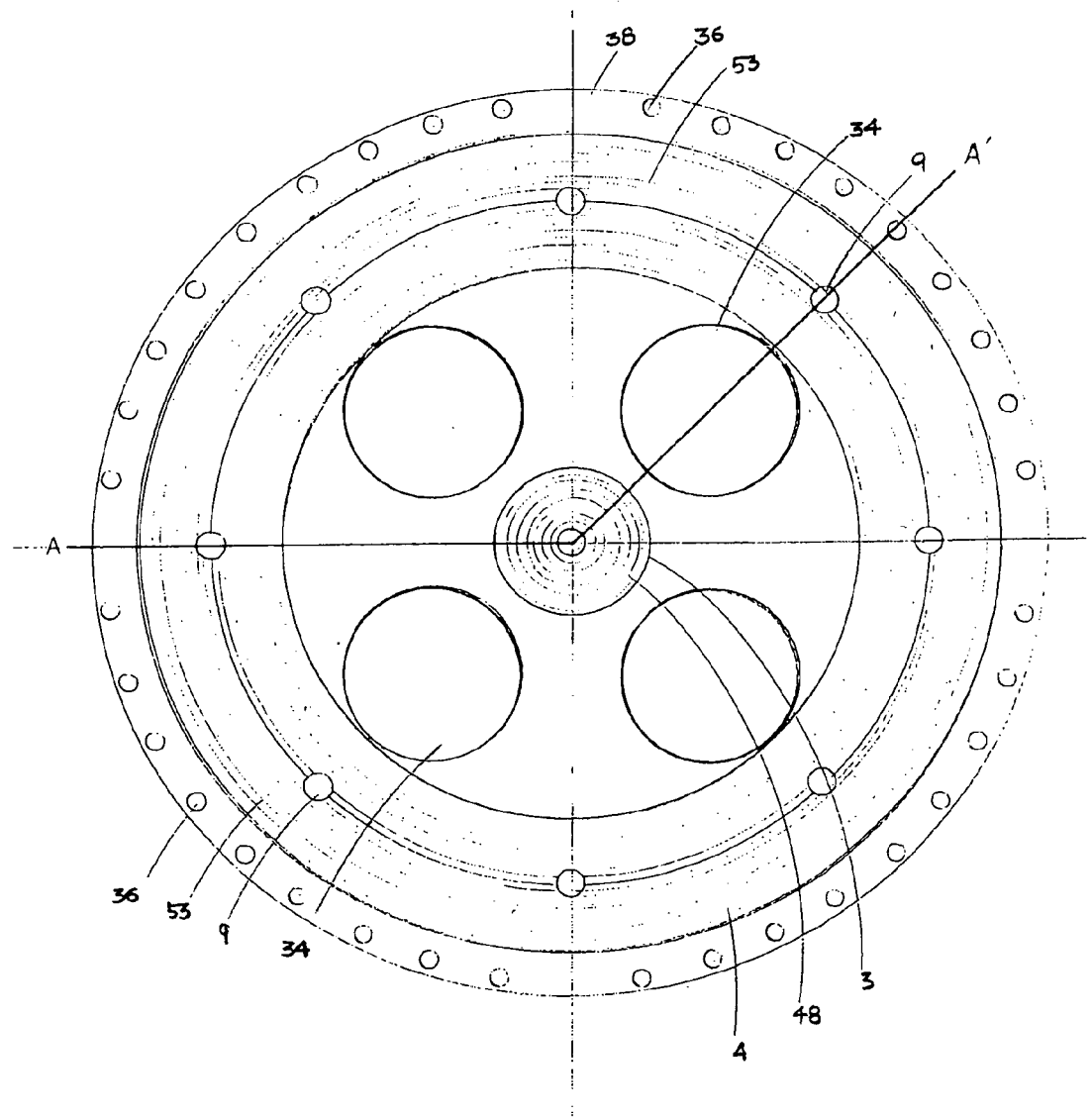
FIG. 9. is a bottom plan view of sky station FIG. 4.
Figure 10:
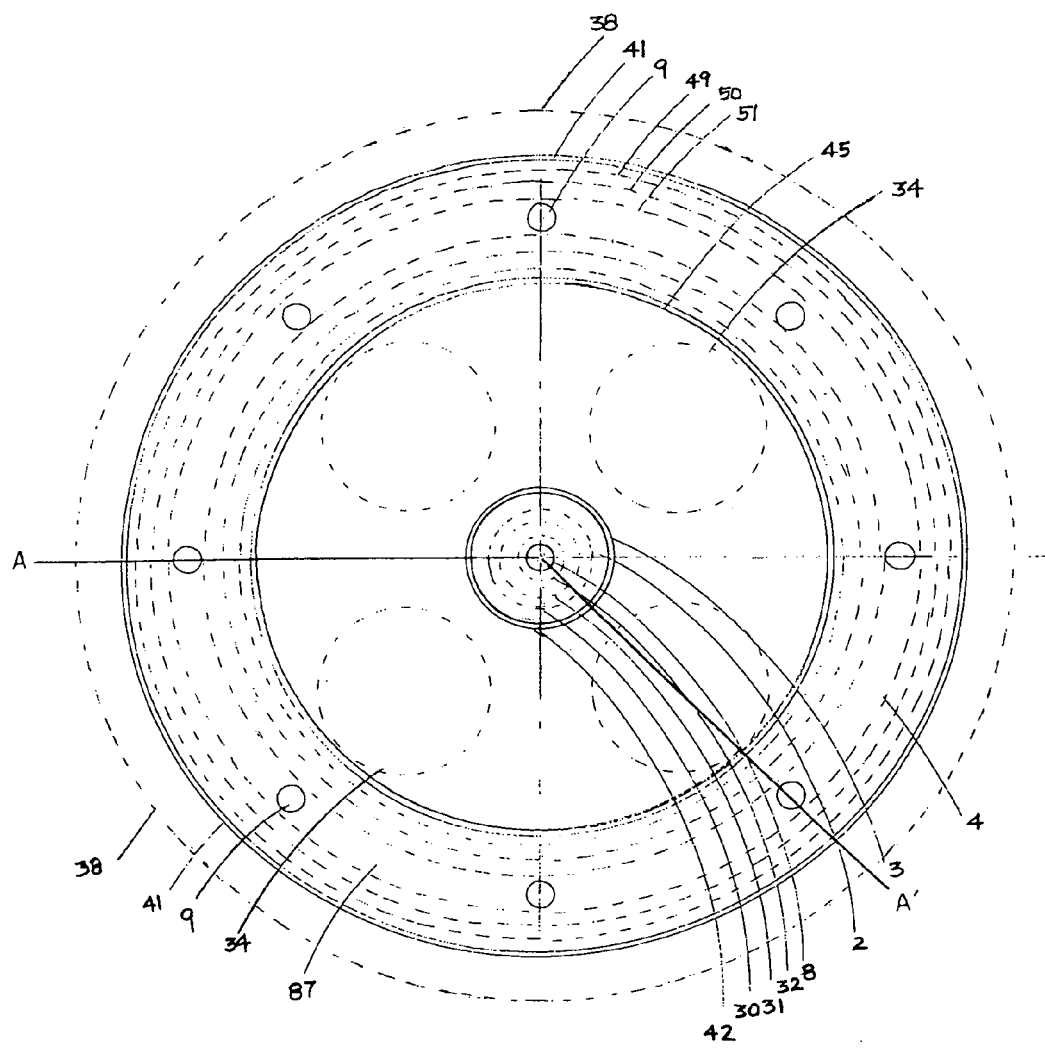
FIG. 10. is a first section plan view of sky station FIG. 4.
Figure 11:
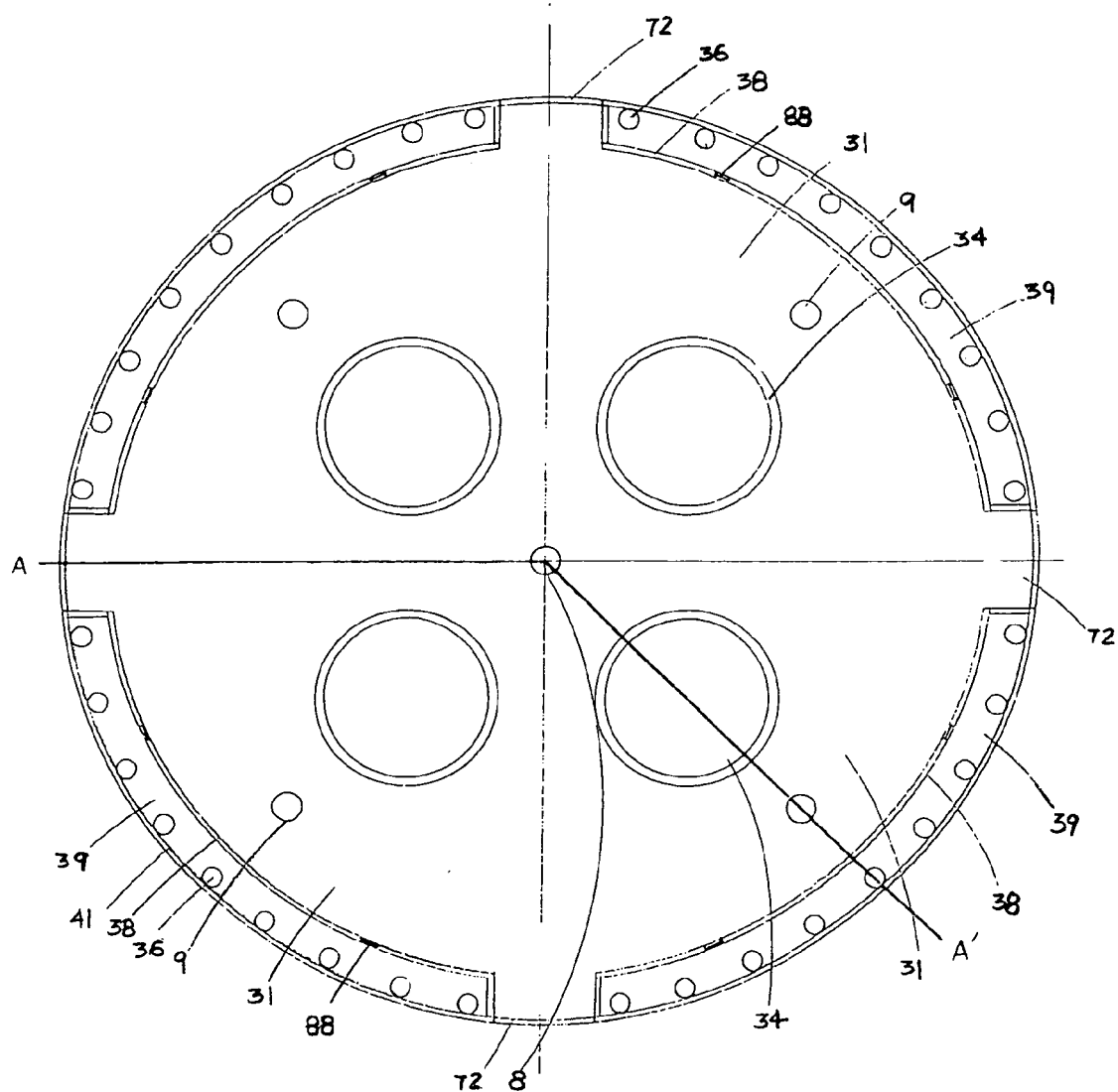
FIG. 11. is a second section plan view of sky station FIG. 4.
Figure 12:
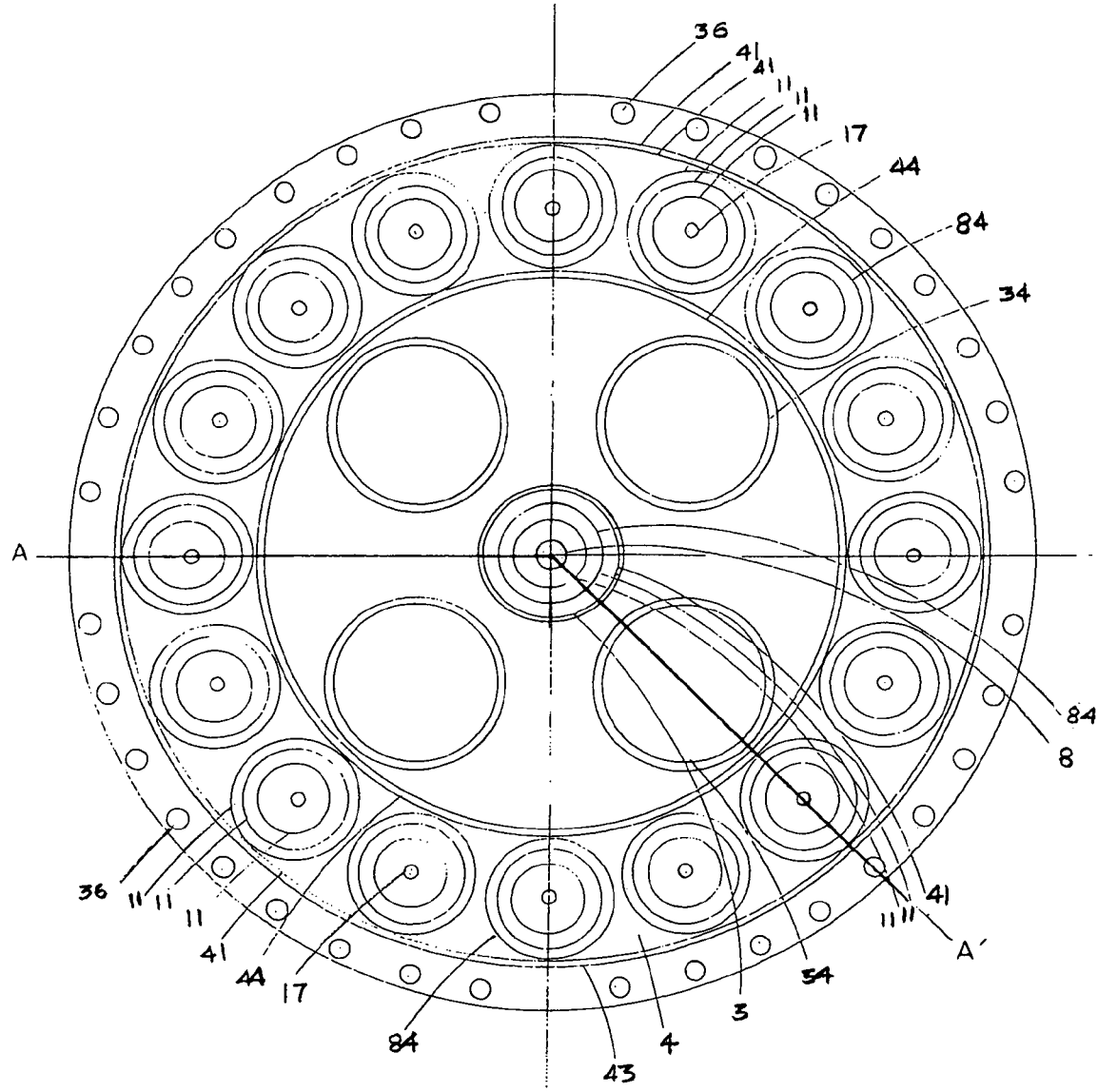
FIG. 12. is a third section plan view of sky station FIG. 4.
Figure 13:
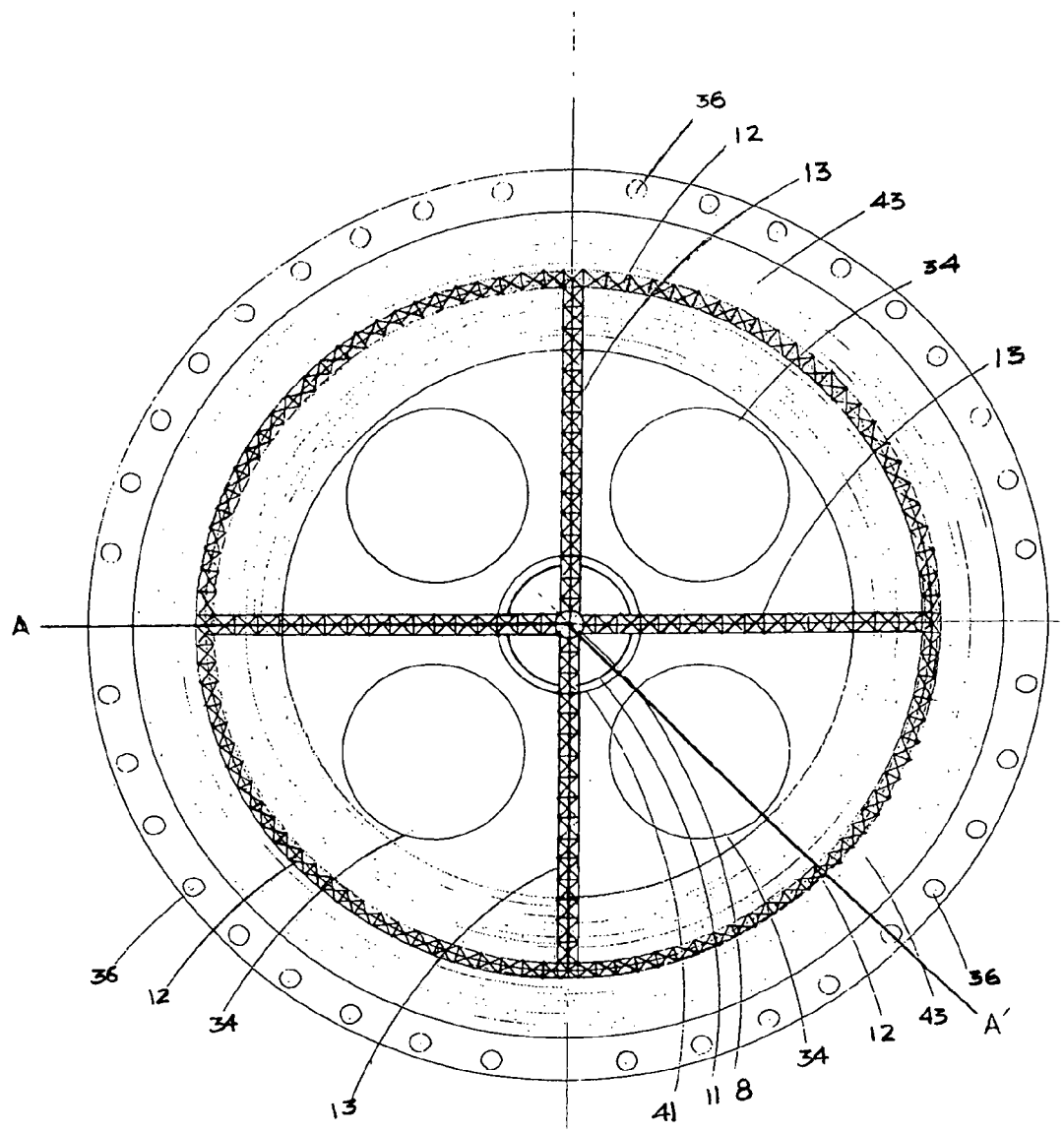
FIG. 13. is a fourth section plan view of sky station FIG. 4.
Figure 14:
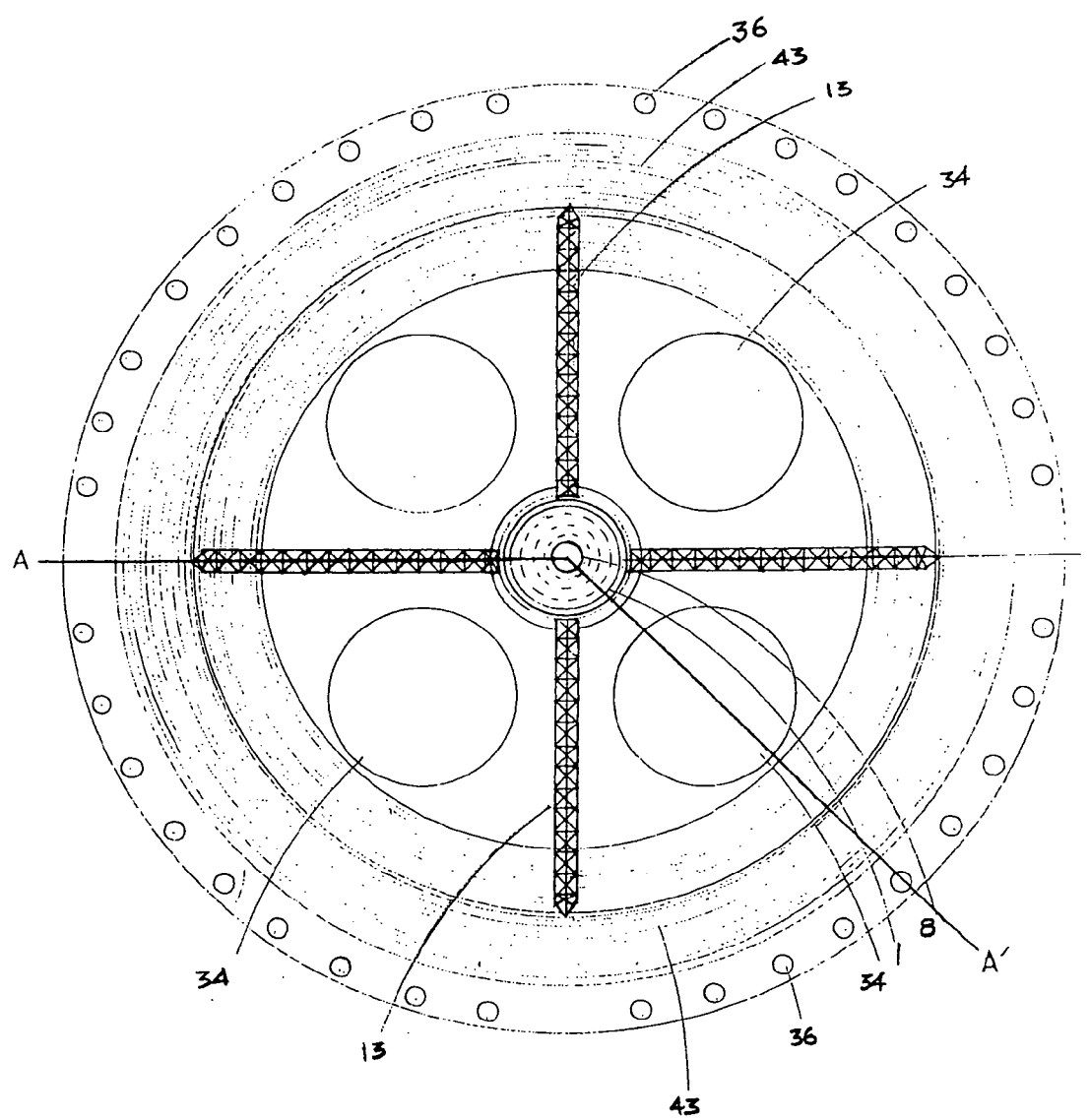
FIG. 14. is a fifth section plan view of sky station FIG. 4.
Figure 15:
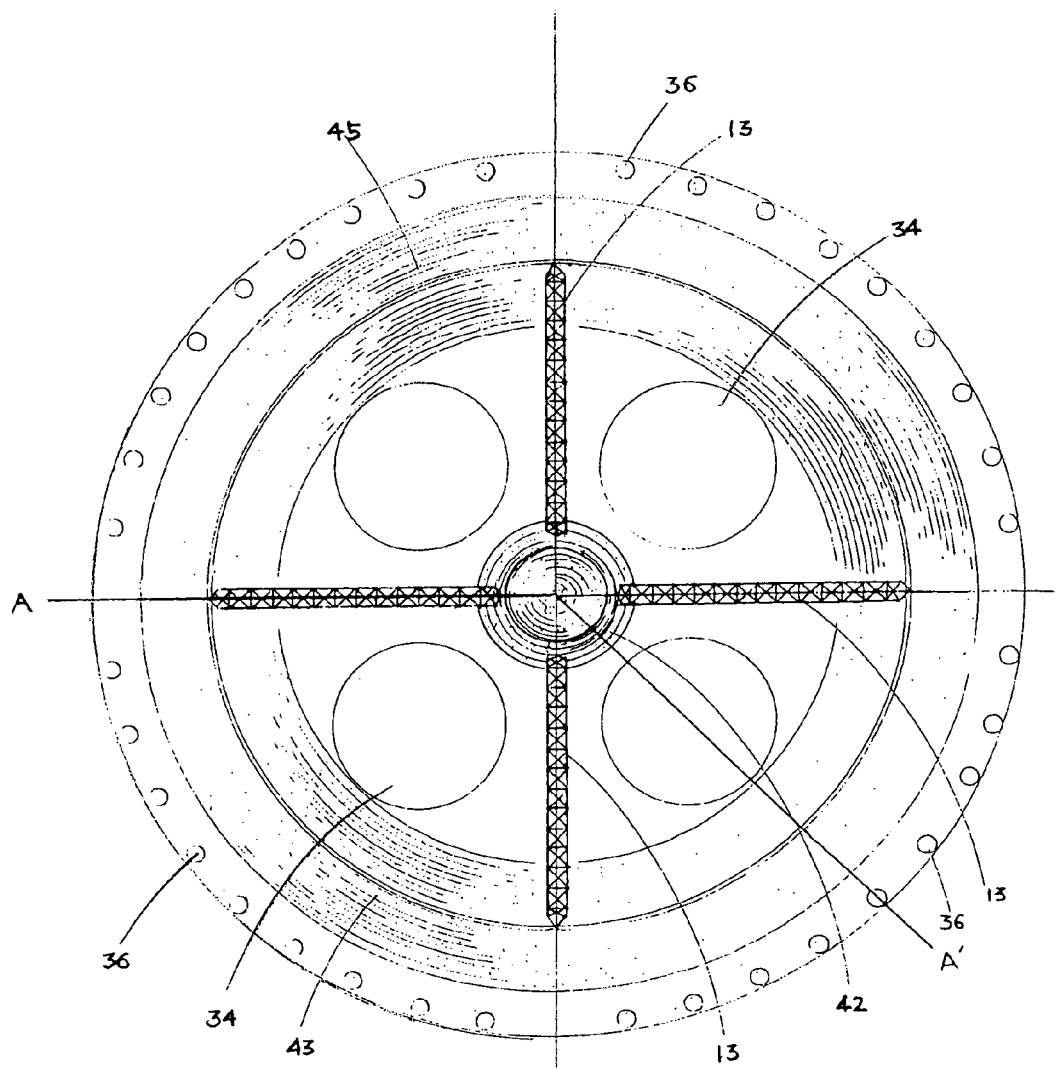
FIG. 15. is a top plan view of sky station FIG. 4.
Figure 16:
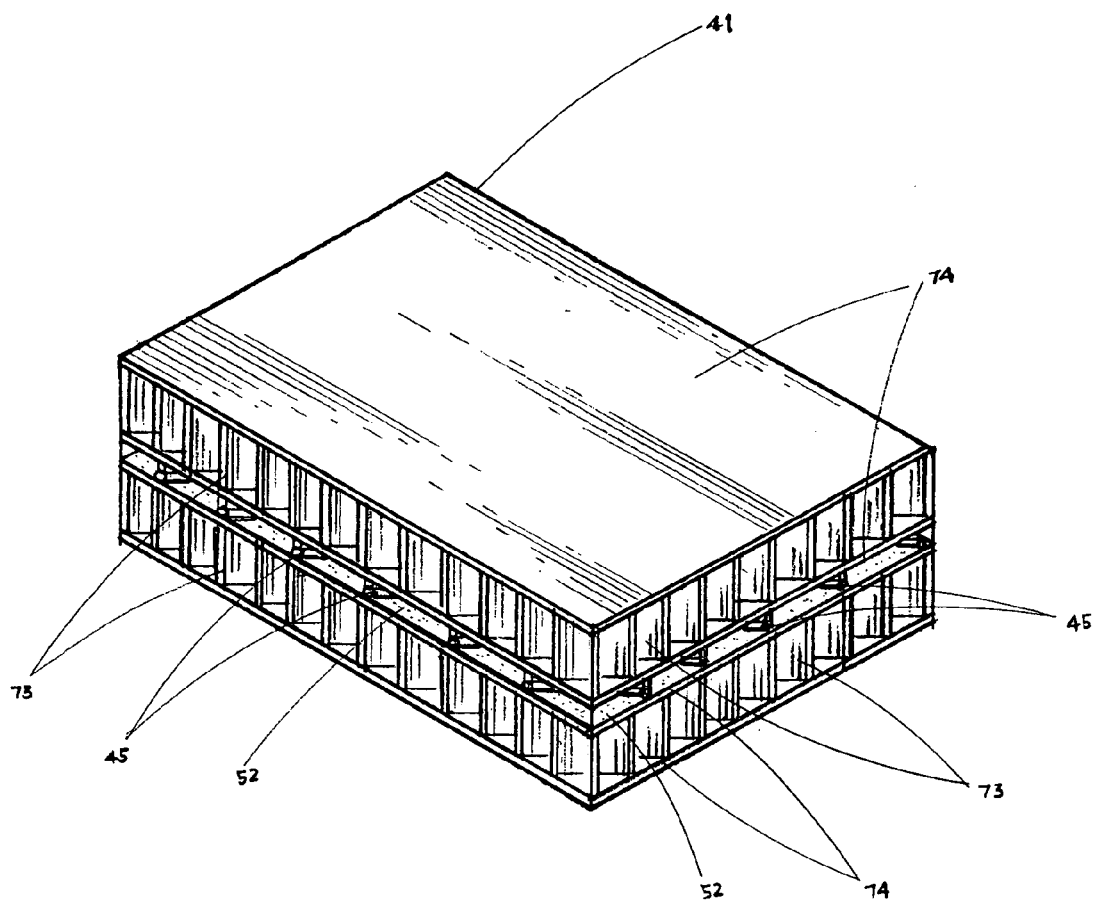
FIG. 16. is a cross section of ceramic fiber outer wall structure view of sky station.

A single vertical center elevator shaft 8, is around fifty feet diameter and one thousand five hundred feet high, and center core structure is link to fully connected and integrated the single fuselage structure which is from the bottom escape cockpit 2, of first section level 27, through multi-floor level through to top escape cockpit 1, of fourth section level 24, structure which is inter-connected and provides reliable transportation, as shown in FIGS. 7, 8 and 17. The sky station's first through third floor of second section level 26, is comprised of an outer ring which is a large circular disc-shape or toroid structure which is around one thousand three hundred fifty feet in diameter and one hundred feet height with outer circular wall structure 41.

The outer ring 4 is further comprised of four circular inner launch/docking bay platform 34 that are around two hundred fifty diameter and one hundred feet height from bottom of first floor through to top third floor of second section level 26.

The center-ring cone shaped structure 5, is around two hundred feet diameter and one hundred fifty feet height, and V-shaped circular structure 6, is around eight hundred feet inner ring's inside diameter and one thousand two hundred feet outside ring diameter and two hundred feet height at first section level structure 27. The top third floor of second section level 26, structure is directly connected to the bottom of inner-ring circle envelope structure 3, and is around two hundred feet diameter and one thousand two hundred fifty feet in height. The bottom of outer ring circle envelope structure 4, is around eight hundred feet inner ring diameter and one thousand two hundred feet outer ring diameter of third section level structure 25. The top floor of center-ring structure 3, is around one hundred fifty feet diameter of third section level 25, is directly connected to bottom floor is around one hundred fifty diameter and one hundred fifty feet height cone shaped of fourth section level structure 24, which provides aerodynamic efficient vertical flight of the single structure. As shown in FIGS. 7, 8, 12, and 17.

The sky station 100, a structure of multi-vertical elevator shaft is around fifty feet diameter and two hundred fifty height of outer-ring 4, structure is comprise from bottom landing pad 77, of first floor of first section level 27, structure through to the third floor of second section level 26, is directly connected and an integrated structure, which provides inner transportation, as shown in FIGS. 7, 8 and 17.

The sky station 100, has a plurality of multiple thin and soft envelopes 11 of inner circle-ring structure 3 and the outer ring structure 4, which are anchor to anchor plates 82, of first floor edge of third section level 25, and to anchor plates 82, of bottom ceiling of fourth section level 24. This allows for the structure to be leak proof as it is sealed all around the circular anchor plates. The envelopes 11 in the outer structure are also connected in the middle to a post pole 17 which is around twenty feet in diameter and eight hundred feet in height.

The inner ring circular envelope (3) and the outer ring 4 have and outer envelope and sidewall 41 and 43 that have a thickness around one quarter inch thick and are made of carbon fiber honeycomb composite impregnated with carbon wires 45.

The sky station 100, combines dual propulsion comprising jet power and rocket power plant 68, which co-exist side by side and separated by insulated wall 38. Each door 88, at edge of second floor at second section 26, level structure, is provided with the combined jet and rocket propulsion system to vertically ascend flight with nozzles 37, to low altitude atmosphere through to stratosphere and vertically descend flight to earth terminal station 98 with nozzles 36, as shown in FIGS. 1, 2, 3, 4, 5, 7, 8 and 17. Specifically, jet power plant 39, is located on the edge circle on the second section level 26. The sky station's rocket propulsion power plant co-exists with insulated wall and door for the jet propulsion power plant compartment 68, at second section level 26, which provides rocket thrust power to two-way duct pipe through the bottom nozzle 37, at bottom circle edge of second section level 26, and another is upper nozzle 36, at top third floor of second section level 26, structure, which is control and moveable angle direction provide direction of thrust power of sky station, as shown in FIGS. 7, 8, 9, 11 and 17.

The sky station 100, sky station's inner dual launch/docking bay platform 34, which is locate at multi inner-ring launch/docking bay 34, between center hanger, and outer ring 4 is around one hundred feet wide and sixty feet height with curved sliding gate at second floor of second section level 26, structure and the inner launch/docking bay comprise a four-position open circle space passage hole 34, from bottom of first floor through to top of third floor of second section level 26. The inner dual launch/docking bay provides launch and docking in-coming vertical transport through inner open passage circle hole passage 34, is a two hundred fifty feet diameter air passage which is need to dock or depart by vertically upward flight or downward flight to maneuver fully co-operate with electro-computer operating system as shown in FIGS. 1, 3, 7, 8, 11 and 17.

The sky station 100, includes four outer launch docking bays 72 that are positioned in the outer wall of the circular outer ring edge structure of the second section level 26. Adjacent the outer launch docking bays 72 are a plurality of dual-robotic arms 40, operated by electro-computer autonomous system, which are attached to the outer insulated wall 38 of the circular outer ring edge structure.

The sky station 100 has a plurality of individual landing pads 77 at the bottom of elevator shafts 8, at first floor of first section level 27. The landing pads 77 are the first object of the sky station to touch-down at earth terminal station 98.

The sky station 100 circular large-truss structures 12, are attached to multiple center post poles 17 at the third section level 25 so as to provide strength structure of each-helium gas bag of large-cylindrical envelope 11, 12. There are multiple straight line bridge truss 13, that are directly connect from multi-portion of top circle-truss structure 12, to multi-circle portion of center elevator's 8 mid-level shaft structure at third mid-section level structure 25 as shown in FIGS. 7, 8, 13, 14, 15 and 17.

What is claimed is:

1. A sky station comprising:
   a vertical cylindrical fuselage directly connected to a top cone and a bottom cone, the top and bottom cones comprising escape cockpits,
   wherein the vertical cylindrical fuselage is defined by an envelope,
   an outer ring comprising a toroid envelope surrounding the vertical cylindrical fuselage,
   wherein the envelope of the vertical cylindrical fuselage and the outer ring comprise a plurality of helium filled gas bags such that the sky station can mass-levitate and float,
   the vertical cylindrical fuselage comprising a first, second, third, and fourth section levels,
   the out ring comprising a first, second, and third section levels wherein the first, second, and third section levels correspond to the first, second, third, section levels of the vertical cylindrical fuselage such that they have the same vertical height,
   the vertical cylindrical fuselage is connected to the outer ring through the second section level wherein the second section level has a circular outer ring edge structure that extends outward from the outer ring and comprises jet and rocket propulsion compartments and nozzles; and
   the vertical cylindrical fuselage and the outer ring comprising elevators in the middle of their respective sidewalls.

2. The sky station of claim 1, further comprising:
   Bridge trusses and guide wires that connect the vertical cylindrical fuselage to a top of the outer ring.

3. The sky station of claim 1, further comprising:
   a third floor at the bottom of the third section level of the vertical cylindrical fuselage and the outer ring comprising rubber sealed floor gates for inspection and repair work.

4. The sky station of claim 1, wherein:
   the second section level includes four docking bays located between the outer ring and the vertical cylindrical fuselage capable of receiving and launching various rockets and spacecraft.

5. The sky station of claim 1, wherein:
   the circular outer ring edge comprises a plurality of outer launch docking bays.

6. The sky station of claim 1, wherein:
   the circular outer ring edge comprises a plurality of outer robotic arms.

7. The sky station of claim 1, wherein:
   the vertical cylindrical fuselage and the outer ring have sidewalls that are made of a carbon fiber honeycomb composite structure that is impregnated with carbon wires.

8. The sky station of claim 1, wherein:
   the first section level of the outer ring comprises fuel tank storage.

\* \* \* \* \*